Dec. 11, 1945. D. FIRTH 2,390,875
ATTACHING MEANS FOR SHEAVES, ETC
Filed Sept. 27, 1943. 2 Sheets-Sheet 1
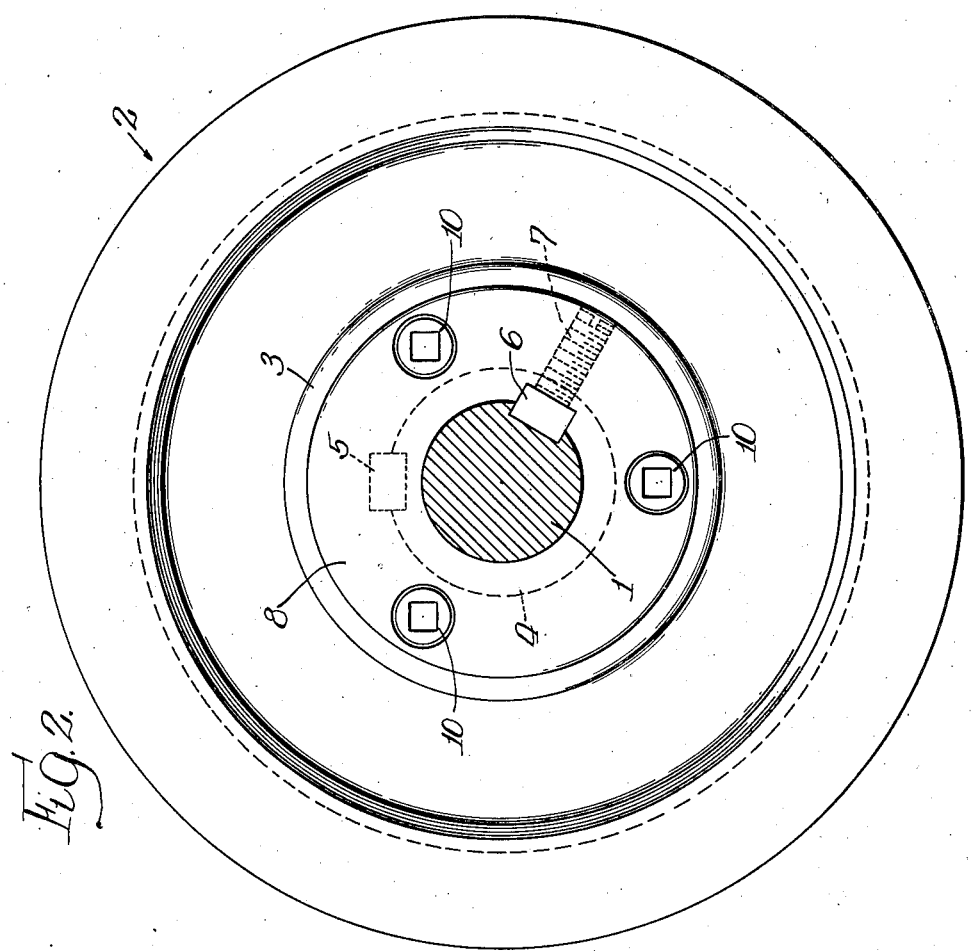
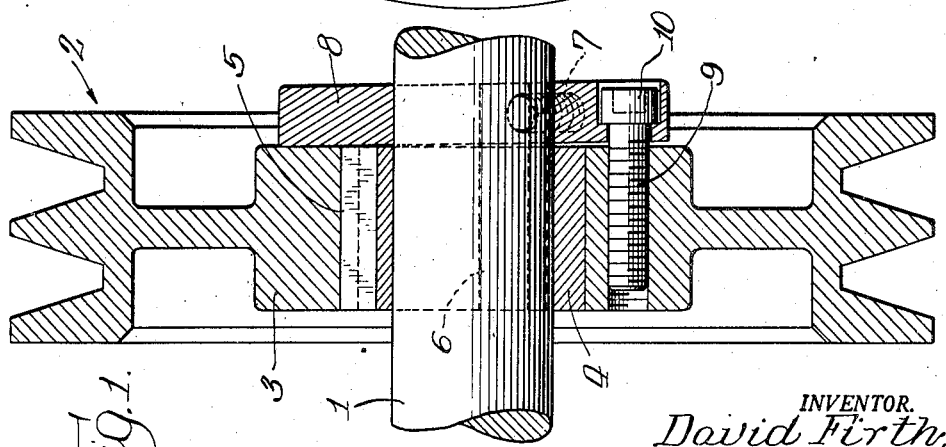
INVENTOR.
David Firth.
BY Osgood H. Dowell
Atty.

Dec. 11, 1945.  D. FIRTH  2,390,875
ATTACHING MEANS FOR SHEAVES, ETC
Filed Sept. 27, 1943  2 Sheets-Sheet 2
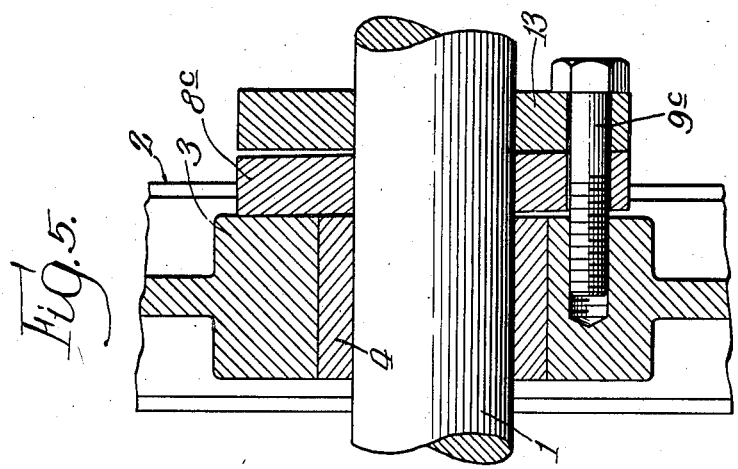
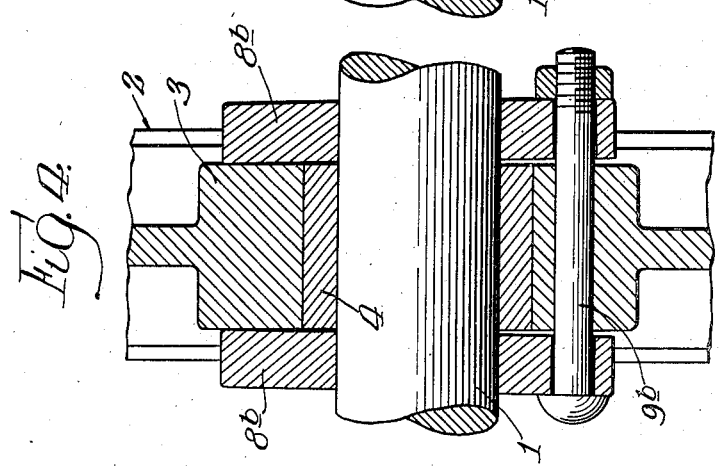
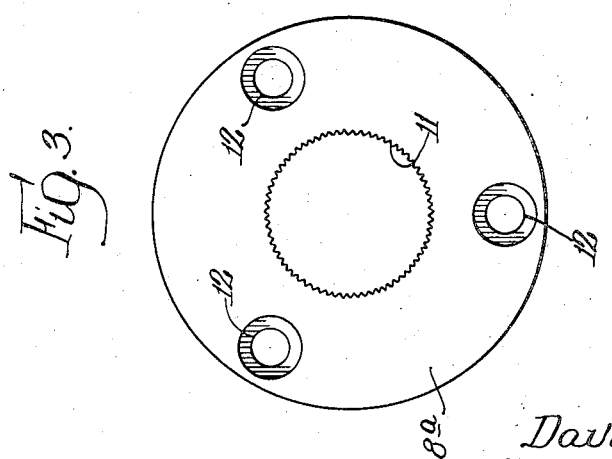
INVENTOR.
David Firth
BY Osgood H. Dowell
Atty.

Patented Dec. 11, 1945

2,390,875

UNITED STATES PATENT OFFICE 2,390,875

ATTACHING MEANS FOR SHEAVES, ETC.

David Firth, South Bend, Ind., assignor to Dodge Manufacturing Corporation, Mishawaka, Ind., a corporation of Indiana Application September 27, 1943, Serial No. 503,914

12 Claims. (Cl. 287—52)

This invention relates to means for attachment of sheaves and other pulleys to motor shafts and other shafts, the invention being also more generally applicable to attachment to shafts of various machine elements including gear wheels, eccentrics, cams, bearings, etc. The invention contemplates attachment to shafts of elements having incontractable straight bored hubs slip-fitted on the shaft. By a straight bored hub is meant one the shaft bore of which is parallel with the hub axis, as distinguished from a tapered bore. Incontractability of the hub implies incontractability of the shaft bore thereof, whether such bore be in a hub bushing or otherwise. One example of an incontractable straight bored hub is shown in the accompanying drawings wherein a cast iron sheave body is shown having its hub bore lined by an unsplit cylindrically bored steel bushing pressed in the body hub. By means of the invention, a sheave or other pulley or element equipped therewith can be slipped over the end of and along a shaft of slightly less diameter than that of the shaft bore and can be fastened to the shaft very effectually by tightening a screw or screws or other suitable threaded bolt fastening means disposed longitudinally of and preferably parallel to the shaft and subjected in use only to tension; and such sheave, pulley or other element can be readily demounted by loosening such fastening means and slipping the sheave, pulley or other element together with the attaching means off from the shaft. The invention will be described with reference to the accompanying drawings, wherein:

Fig. 1 is a longitudinal section of an illustrative embodiment of the invention, shown applied to a sheave for a V-belt drive.

Fig. 2 is an end elevation, looking at the right hand end of Fig. 1.

Fig. 3 is an end view of a collar such as is employed in the attaching means of Fig. 1 but modified by having its bore serrated.

Figs. 4 and 5 are longitudinal sections of other embodiments of the invention. The hub shown in these figures may be that of the sheave shown in Fig. 1 or that of another sheave, pulley or other element.

In the drawings, 1 denotes a shaft on which is slip-fitted a sheave 2. This sheave may comprise, for example, a cast iron sheave body having its hub 3 lined by an unsplit steel or cast iron bushing 4 pressed therein, which bushing is to be regarded as a part of the sheave hub. Though the cast iron sheave body could itself be bored to fit the shaft, it is preferable to form it with a hub bore of substantially larger diameter than the diameter of the shaft and to equip it with a hub bushing as shown; thus permitting manufacture of sheaves as cast iron bodies with hub bores of the same diameter fitted with bushings of uniform outside diameters and whose inside diameters can be bored to fit the shafts to which the sheaves are respectively to be applied. The bushing 4 should be very tightly fitted in the sheave body, as, for example, by forcing into the hub part 3 a bushing of the same diameter as that of the bore of the body. The bushing may be keyed to the body by a key 5, preferably driven with a tight fit into mating grooves or keyways of the body hub and bushing, so as to obviate need of a set screw or other means for securing it in place. However the key 5 could be dispensed with by the use of a bushing originally of an outside diameter slightly greater than the diameter of the hub bore of the sheave body, and contracted by pressing it therein; for by forcing into the cast iron body a steel or cast iron bushing one or two thousandths of an inch larger in outside diameter than the diameter of the body bore, there is obtained not only an exceedingly tight fit but also such a strong grip of the bushing by the surrounding hub portion of the sheave body as to provide an effectual driving or torque-transmitting connection. The sheave hub may be keyed to the shaft by a shaft key 6 fixed to the shaft and slip-fitted in a keyway in the hub bushing 4, or slip-fitted in grooves or keyways in the shaft and bushing and retained in place by a set screw 7 as hereinafter explained.

Slip-fitted on the shaft adjacent and in abutting relation to the sheave hub is a collar 8, preferably of steel. This collar, preferably an incontractable undivided one-piece element, has a straight or untapered shaft bore of substantial length, so that canting thereof will be resisted by engagement of the shaft therewith. The collar is otherwise of appropriate proportions for adequate stiffness and strength and for the purposes of the invention as hereinafter indicated. In the preferred embodiment of the invention shown in Fig. 1, the shaft bore of said collar is skewed or inclined to the longitudinal center of the collar, so that the shaft normally holds the collar in a slightly tilted posture. Preferably the collar has parallel front and back faces slightly aslant to the collar bore. Hence in the positions in which the hub and collar are normally held by the shaft, the front face of the collar is correspondingly inclined to the adjacent end face of the hub, the latter being substantially perpendicular to the hub bore. An angle of inclination between the abutment faces of the collar and hub of about one degree is represented in the drawings, though the inclination may be more or less than indicated. In a construction of about the relative proportions shown in the drawings, an angle of inclination of from about .5 to 1.5 degrees would be suitable, though the inclination may be at a greater angle, and in any specific embodiment of the invention the preferred angle of inclination will depend upon the particular design and relative proportions of parts. The collar is connected to the sheave hub by longitudinaly arranged threaded bolt means, represented in this instance by a plurality of angularly spaced screws 9 in threaded engagement with the sheave hub and parallel to its axis, said screws passing loosely through holes therefor in the collar and having enlarged heads 10 engaging the back of the collar or seats therefor in collar recesses in which the screw-heads are countersunk. As shown in Fig. 2, the countersunk screw-heads are provided with square sockets for engagement by a socket wrench for tightening or loosening the connection between the sheave hub and collar.

When the screws 9 are under no tension, the shaft holds the sheave and collar 8 substantially aligned or with their bores substantially parallel, under which condition, as well as during tightening of the screws, the collar can abut against the sheave hub only at one point to one side of the shaft, due to the aforesaid inclination of the front face of the collar to the collar bore and hence to the confronting end face of the hub. By tightening the screws or any of them, and especially by tightening that one of the three screws shown which is most remote from said point than the others, the collar and hub are forcibly drawn one against the other toward a position for abutment of the collar squarely against the hub, or in other words toward a position of parallelism of their abutting faces; in which action both the collar and hub are stressed in a manner tending to force them to a relationship in which their bores are at an angle to each other, or in other words tending to cant them relative to the shaft, with resultant gripping of the shaft by the collar and also by the hub. Assuming an inclination of the collar bore at an angle of about one degree to a line perpendicular to the collar faces, in a construction of the design and relative proportions of parts shown, the collar and hub can by severe tensioning of the several screws be forced substantially or nearly to a squarely abutting relationship, with consequent very powerful gripping of the shaft and locking of the hub and collar thereto. The tight locking grip thus obtainable, or even that obtainable with substantially less severe tightening of the screws, may under many conditions of service be entirely sufficient for a driving or torque-transmitting connection; though it may nevertheless be desirable to key the sheave hub to the shaft, by means of the key 6, to assure adequate driving connection under any conditions of service, especially since it may often be desirable to use the attaching means principally to secure a splined slip-fitted sheave or other pulley or element against displacement axially relative to the shaft. Upon loosening the screws sufficiently to release them from stress, the shaft will immediately restore the hub and collar to a relationship in which their bores are substantially aligned, whereupon they can be slipped off from the shaft.

Substantially the same action and effect would be obtainable, though in a less desirable manner, with the use in place of the collar 8 of a similarly mounted and connected collar having its shaft bore normal to or at right angles to its faces, by forming the adjacent end face of the hub at an inclination to the hub axis, or by interposing between the hub and collar a washer having its opposite faces in relatively inclined planes, or by forming the front face of the collar or the confronting face of the hub with a projection arranged to provide for abutment of the collar against the hub primarily at a point to one side of the shaft and to allow them to be brought closer together by stressing them as aforesaid by tightening the screws or other threaded bolt means connecting the hub and collar. Therefore such formal modifications, even though they may be less desirable or less fully advantageous than the preferred form of the invention shown, are not to be regarded as involving a departure from the primary principle of the invention. And in case of interposition of a washer between the hub and collar of the construction shown, or of any construction embodying the invention, the washer may be considered as providing a bearing face for the hub, or the collar may be considered as abutting or bearing against the hub indirectly through such washer.

An important advantage of the invention is that it affords opportunity, more especially in the case of sheaves and pulleys for light and moderately light duties, of dispensing with shaft keys. The shaft key 6 is shown herein partly because it may be desirable or necessary in some cases, and partly because the keying of sheaves and pulleys to shafts is conventional practice. Motor shafts to which sheaves and pulleys are to be applied, and power take-off shafts of transmission units, are commonly equipped by the manufacturers with shaft keys for engagement with the hubs of the sheaves or pulleys to be mounted thereon, so that, whether or not a shaft key may be necessary, it is usually or often necessary to cut the hub bushing with a keyway to accommodate it. However it is highly advantageous to obviate the need of shaft keys, the use of which involves objectionable mutilation of shafts and hub bushings and entails substantial trouble and expense in connection with machining and installation.

If however a shaft key as 6 is used in a construction embodying the present invention, it may be secured fixedly to the shaft and slidably engage the keyway therefor in the hub bushing, or it may be slip-fitted in the keyways of both the shaft and bushing and retained in place by a set screw 7 in the collar 8, the latter being secured rigidly to the shaft and to the hub by the action of the screws 9. So also the key 5, if it should be slip-fitted instead of driven tightly into the grooves therefor in the hub bushing and surrounding hub body 3, could be retained in place by a radially disposed set screw (not shown) in the hub body 3.

As to the matter of fastening sheave and pulley hubs to shafts, it will be apparent that the means therefor provided by the present invention is of practicable and efficient character, by the use whereof such a hub or other hub, whether fitted tightly or slip-fitted on the shaft, can be fastened thereto as effectually or much more effectually and satisfactorily than by means of radially disposed set-screws screwed in the hub against the shaft, though without serious objections incident to the use of the latter. Set screws are notoriously troublesome. They work loose and fail to hold properly, often requiring frequent tightening. And a particular objection to their use is that they gouge or mar unduly and injure shafts. Though the present invention may not eliminate some marring of shafts nor tendency of fastening screws to work loose in service, the difficulties in these respects are much less troublesome than in the case of a connection depending upon thrust of set-screws directly against a shaft. Moreover the tight and secure fastening afforded by the present invention is more reliable than a set-screw connection, in that it is much less liable to material impairment of its security by a slight loosening of an individual screw, and more likely to remain in adequately tight condition in service.

This invention contemplates the provision of a sheave or pulley which together with its attaching means can be quickly mounted and demounted in the manner hereinbefore explained. In a construction designed with that object in view, exemplified by the illustrative structure herein described with reference to Figs. 1 and 2 of the drawings, the element represented by the collar 8, if of only moderate thickness, may advantageously have a fairly close or only moderately free slip fit on the shaft, while the shaft bore of the sheave or pulley hub may be of such a diameter, at least as great as the diameter of the collar bore, as to permit a slip fit of the hub on a shaft of approximately uniform diameter on which the collar is also slip-fittable; though this statement is not intended to exclude a construction in which the shaft bore of the collar may be of slightly greater diameter than that of the hub, considering that in the case of a much thicker collar with a correspondingly much longer shaft bore it may fit the shaft somewhat more freely or loosely than would be appropriate or desirable for a collar of only moderate thickness. As to the sheave or pulley hub, it may be desirable, in the case of a sheave or pulley of such proportions as in Fig. 1 or having a short hub and an effective rim diameter considerably greater than the diameter of its hub, to avoid too free a fit of the hub on the shaft or to provide for a fairly close slip fit thereof, in order to prevent undue canting of the sheave or pulley relative to the shaft by the tightening of the attaching means; whereas in the case of a relatively long hub it may be permissible, as it would also be usually desirable, to provide for a free or easy slip fit, or even in some cases for a somewhat loose fit, since engagement of the shaft with a long hub would ordinarily prevent canting thereof to an objectionable extent. As will be therefore understood, the term "slip fit" is used herein not in any rigid technical sense but as implying such a fit, whether close, free or somewhat loose, of a hub or shaft-bored element on a shaft as to permit it to be slipped on and off from the shaft and to and from position for fastening thereto without great effort (even though perhaps with the assistance of occasional tapping with a hammer); as distinguished however from such a close or tight fit as to require forcing the hub or element on the shaft by great pressure or by successive heavy hammer blows. Assuming a shaft ground to a substantially true cylindrical surface of uniform diameter, a close slip fit would ordinarily be obtainable by a shaft bore of a diameter from two thousandths to two and one-half thousandths of an inch larger than the diameter of the shaft; while a difference between these diameters of from three to four thousandths of an inch would ordinarily give a free and easy slip fit; and a greater difference might result in a looser fit than would ordinarily be desirable. The invention is not however intended to be limited to any specific dimensions or ranges thereof in these respects, especially since appropriate dimensions for a slip fit in the sense of this specification would depend upon various factors including hub lengths, relative proportions of parts in different designs, degree of uniformity or approximate uniformity of shaft diameters and conditions of shaft surfaces. For example, an ordinary commercial shaft of theoretically a given size, but actually not truly uniform in diameter nor smoothly surfaced, may require for a slip fit of a hub thereon a bore diameter from four or five thousandths to eight or nine thousandths of an inch larger than the shaft diameter, according to the length of the hub and to whether it is to have a close or free and easy slip fit.

Fig. 3 of the drawings shows a collar 8ª which except for its serrated bore is identical to that previously described. The serrations indicated at 11 are formed by cutting in the collar bore parallel therewith adjacent V-shaped grooves, leaving ridges saw-tooth like in cross-section the edges of which define the bore proper, or in other words the collar bore to fit the shaft is represented by an imaginary cylindrical surface in which lie said edges. The serrations may be fine or course and accordingly their number and pitch may be varied. As the collar is forcibly canted relative to the shaft by the tightening of its connections with the sheave hub, the edges of the inverted V-shaped ridges may bite into the metal of the shaft, giving increased gripping effect. The serrations being parallel to the bore do not interfere with the drawing of the collar toward or against the sheave hub, but on the contrary tend to ease and facilitate such drawing, and are therefore additionally advantageous when the collar bore proper is of a diameter only so slightly greater than that of the shaft as to allow for a close slip fit. The holes 12 in Fig. 3 are those for passage of the screws previously referred to when the collar 8ª is used in place of the collar 8 in Figs. 1 and 2.

Fig. 4 shows a construction differing from that first described only in that a pair of collars 8ᵇ, each substantially identical to 8, are arranged in abutting relation to the opposite end faces of the sheave hub and connected by through bolts 9ᵇ corresponding in number and arrangement to the screws 9 shown in Fig. 2. The collars so connected may be arranged in various relative positions. As shown, they are arranged symmetrically, so that the points at which they bear against the hub faces are at corresponding positions at the same side of the shaft. With this arrangement, the action of the two collars, which are concurrently drawn more tightly against the hub faces by the tightening of the bolts, neutralize tendencies to cant the sheave relative to the shaft, since the forces exerted on the hub by the tightening of the connections of the collars therewith act in opposition, clamping the hub rigidly between said collars, the latter being rigidly locked to the shaft. If the collars 8ᵇ were unsymmetrically arranged with their points of abutment against the hub faces at diametrically opposite sides of the shaft, then the forces transmitted to the sheave hub through the two collars would become coupled and would mutually tend to cant the hub in the same manner. A condition between these two extremes, such that the tendency of each collar to cant the sheave hub would be partially counteracted by tendency of the other to cant it opposingly or in a different manner, would be obtainable by arranging the collars 8b in other relationships, as is possible since the three bolts shown can pass through the three bolt holes of each collar in any of three different angular positions of the latter relative to the hub.

Fig. 5 shows a construction differing from that first described only in that the collar 8c, corresponding to 8, is connected to the sheave hub by bolts 9c and a second collar 13 loose on the shaft behind and abutting the collar 9c, said collar 13 being directly connected to the sheave hub by said bolts, and the collar 9c being connected to said hub by said bolts indirectly through the back collar 13.

While the primary utility and importance of this invention is more particularly in connection with quickly mountable and demountable sheaves and other pulleys as hereinbefore described, the novel attaching means provided by the invention may also be advantageously used for fastening pulley hubs and other hubs to shafts on which they are fitted tightly. As hubs directly mounted on shafts even with a tight driving fit are commonly fastened thereto by set screws to secure them against displacement relative to the shaft by creeping or shiftage either longitudinally or rotationally or both under conditions of service, so also they can be so fastened and secured more satisfactorily and reliably by the attaching means of the present invention.

In the following claims, the expression "threaded bolt means," is to be understood as inclusive of screws and any of the threaded bolt means shown in the drawings, and the term "abutting" is to be understood as inclusive of abutting directly or indirectly through an interposed washer.

I claim:

1. A pulley or other machine element slip-fittable on a shaft and having means for fastening it thereto comprising a straight-bored collar slip-fittable on such shaft, there being provision whereby said collar and element can abut only in a manner other than squarely while their bores are substantially aligned and can abut squarely only when their bores are at a certain angle to each other, and threaded bolt means parallel with the shaft arranged for drawing said collar tightly against said element to or towards a position abutting squarely thereagainst, so that by tightening said bolt means the collar can be forcibly canted to grip the shaft.

2. A pulley or other machine element slip-fittable on a shaft and having means for fastening it thereto comprising a straight-bored collar slip-fittable on such shaft, said collar having flat faces inclined to the bore thereof and said element having the hub end face thereof confronting said collar perpendicular to the bore of the hub, and longitudinally disposed threaded bolt means connecting said hub and collar and by tightening of which they can be drawn forcibly one against the other.

3. A pulley or other machine element slip-fittable on a shaft and having means for fastening it thereto comprising a straight-bored collar slip-fittable on such shaft, the confronting faces of said element and collar being normally relatively inclined, and longitudinally disposed threaded bolt means connecting said element and collar and by tightening of which they can be drawn forcibly one against the other.

4. A pulley or other machine element slip-fittable on a shaft and having means for fastening it thereto comprising a straight-bored collar slip-fittable on such shaft, the confronting faces of said element and collar being normally relatively inclined, and longitudinally disposed threaded bolt means connecting said element and collar and by tightening of which they can be drawn forcibly one against the other, said bolt means comprising a plurality of at least three bolts or screws parallel to the hub axis and spaced at substantially equal angular distances apart and arranged at equal radial distances from the shaft.

5. A pulley or other machine element slip-fittable on a shaft and having means for fastening it thereto comprising a pair of straight-bored collars in abutting relation to the opposite end faces of the hub of said element and slip-fittable on such shaft, said hub end faces and confronting faces on the collars being normally relatively inclined, and longitudinally disposed threaded bolt means connecting said hub and collars and by tightening of which said collars can be drawn forcibly against the hub.

6. A pulley or other machine element slip-fittable on a shaft and having means for fastening it thereto comprising a pair of straight-bored collars in abutting relation to the opposite end faces of the hub of said element and slip-fittable on such shaft, said hub end faces and confronting faces on the collars being normally relatively inclined, and longitudinally disposed threaded bolt means connecting said hub and collars and by tightening of which said collars can be drawn forcibly against the hub, said last mentioned means comprising a plurality of bolts or screws parallel to the hub axis and arranged substantially equidistant from the hub axis and equally angularly spaced.

7. Means for fastening to a shaft a machine element mountable directly thereon comprising a straight-bored collar to fit said shaft and adjustable means for connecting said element and collar in abutting relation and by tightening of which the collar can be drawn forcibly against said element, there being provision whereby said collar when its bore is substantially aligned with that of said element can bear thereagainst only in a manner other than squarely and can be forced squarely thereagainst only by canting the collar relative to the shaft.

8. Means for fastening to a shaft a machine element mountable directly thereon comprising a straight-bored collar to fit said shaft and adjustable means for connecting said element and collar in abutting relation and by tightening of which the collar can be drawn forcibly against said element, the confronting faces of said element and collar being such that they can be brought squarely one against the other only by forcing said collar and element to a relationship in which their bores are at an angle to each other.

9. A pulley or other machine element slip-fittable on a shaft and having means for fastening it thereto comprising a straight-bored collar slip-fittable on such shaft, the bore of at least one of said collar and element being skewed or oblique to the longitudinal center thereof so that the shaft normally holds said one in a tilted posture, and threaded bolt means parallel with the shaft connecting said collar and element in abutting relation and by tightening of which said one having a skewed bore is drawn to or toward an erect position on the shaft.

10. A pulley or other machine element slip-fittable on a shaft and having means for fastening it thereto comprising a straight-bored collar slip-fittable on such shaft, the bore of the collar being skewed or oblique to the longitudinal center of the collar so that the shaft normally holds the collar in a tilted posture, and threaded bolt means parallel with the shaft connecting said collar and element in abutting relation and by tightening of which the collar is drawn to or toward an erect position on the shaft.

11. The combination comprising a pulley or other machine element having a straight-bored hub, a cylindrical member on which it is fitted, a straight-bored collar slip-fitted on said member, and threaded bolt means parallel with the shaft connecting said hub and collar in abutting relation, there being provision whereby said collar and hub can abut only in a manner other than squarely while their bores are substantially aligned and can abut squarely only in a relationship in which their bores are at a certain angle to each other, said bolt means being arranged for drawing them toward said relationship, whereby the tightening of said bolt means forcibly cants the collar to effect gripping of said member thereby.

12. The combination comprising a pulley or other machine element having a straight-bored hub, a cylindrical member on which it is fitted, a straight-bored collar slip-fitted on said member, the bore of said collar being oblique to the longitudinal center of the collar so that said member normally holds the collar in a tilted posture, and threaded bolt means parallel with the shaft connecting said hub and collar in abutting relation and by tightening of which the collar is drawn toward an erect position on said member, whereby to effect gripping of said member by said collar.

DAVID FIRTH.